(12) United States Patent
Kim et al.

(10) Patent No.: US 8,249,403 B2
(45) Date of Patent: Aug. 21, 2012

(54) OPTICAL WIRING BOARD AND MANUFACTURING METHOD THEREOF

(75) Inventors: Sang-Hoon Kim, Goonpo-si (KR); Han-Seo Cho, Daejeon (KR); Joon-Sung Kim, Suwon-si (KR); Jae-Hyun Jung, Ansan-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 148 days.

(21) Appl. No.: 12/761,716

(22) Filed: Apr. 16, 2010

(65) Prior Publication Data

US 2011/0116737 A1     May 19, 2011

(30) Foreign Application Priority Data

Nov. 13, 2009 (KR) .................. 10-2009-0109767

(51) Int. Cl.
    *G02B 6/12*      (2006.01)
    *G02B 6/10*      (2006.01)

(52) U.S. Cl. .......................................... 385/14; 385/129

(58) Field of Classification Search .................... 385/14, 385/129
See application file for complete search history.

(56) References Cited

U.S. PATENT DOCUMENTS 7,184,617 B2 * 2/2007 Korenaga et al. ............... 385/14

FOREIGN PATENT DOCUMENTS

| | | |
|---|---|---|
| JP | 2009-058923 | 3/2009 |
| KR | 10-2009-0113147 | 10/2011 |

OTHER PUBLICATIONS

Korean Office Action, with partial English Translation, issued in Korean Patent Application No. 10-2009-0109767, dated Mar. 23, 2011.

* cited by examiner

*Primary Examiner* — Brian M. Healy
*Assistant Examiner* — Mary El Shammaa
(74) *Attorney, Agent, or Firm* — McDermott Will & Emery LLP

(57) ABSTRACT

An optical wiring board and a manufacturing method thereof are disclosed. In accordance with an embodiment of the present invention, the method includes providing a flexible optical waveguide layer, selectively forming a reinforcing clad on one surface of the optical waveguide layer and forming a mirror groove on the other surface of the optical waveguide layer in accordance with where the reinforcing clad is formed. Thus, the clad can be formed thick only on the place where the mirror groove is to be formed, and thus a flexible optical wiring board having flexibility can be manufactured even though the optical wiring board is generally made thin.

11 Claims, 18 Drawing Sheets

OPTICAL WIRING BOARD AND MANUFACTURING METHOD THEREOF

CROSS-REFERENCE TO RELATED APPLICATIONS

This application claims the benefit of Korean Patent Application No. 10-2009-0109767, filed with the Korean Intellectual Property Office on Nov. 13, 2009, the disclosure of which is incorporated herein by reference in its entirety.

BACKGROUND

1. Technical Field

The present invention is related to a flexible optical wiring board and a manufacturing method thereof.

2. Description of the Related Art

Due to the high speed and large capacity of data processed in electronic components, the conventional printed circuit board technology using copper-based electrical wiring patterns has reached its limit. In order to overcome the problems of the conventional copper-based electrical wiring patterns, optical wiring boards including optical wiring are recently receiving attention.

In the optical wiring board including optical wiring, the optical waveguide that can transceive signals through light by using polymers and optical fibers is inserted in a printed circuit board, and this is referred to as an electro-optical circuit board (EOCB). The EOCB is commonly employed in switches and transceiving devices of a communication network, switches and servers for data communication, communication for the aerospace industry and the avionics, mobile phone base stations of a universal mobile telecommunication system (UMTS) and the backplane and daughter board of a super computer.

This kind of optical wiring board also includes a flexible optical wiring board that has flexibility by having a flexible optical waveguide.

In the conventional flexible optical wiring board, however, it is required that a margin be provided to a clad layer of the optical waveguide in order to process a mirror groove, making the optical waveguide thicker and deteriorating the flexibility of the optical waveguide.

SUMMARY

The present invention provides a flexible optical wiring board that can improve the flexibility despite the margin for processing a mirror groove.

An aspect of the present invention provides a method of manufacturing a flexible optical wiring board. In accordance with an embodiment of the present invention, the method includes providing a flexible optical waveguide layer, selectively forming a reinforcing clad on one surface of the optical waveguide layer and forming a mirror groove on the other surface of the optical waveguide layer in accordance with where the reinforcing clad is formed.

The method can further include stacking a flexible cover layer on one surface of the optical waveguide layer, in which the cover layer covers the reinforcing clad.

The method can further include forming a groove-shaped light-permeable part to correspond to the mirror groove by selectively removing a portion of the cover layer.

In the providing of an optical waveguide layer, an optical waveguide layer mounted on a metal layer can be provided, and the forming of a reinforcing clad can include forming a clad groove by selectively removing the metal layer and forming a reinforcing clad in the clad groove.

The method can further include, after the forming of a reinforcing clad, forming a circuit pattern by selectively removing the metal layer.

The forming of a reinforcing clad can include providing a base substrate having the reinforcing clad stacked thereon, disposing the optical waveguide layer and the reinforcing clad of the base substrate in such a way that the optical waveguide layer and the reinforcing clad are placed opposite to face each other and compressing the optical waveguide layer and the base substrate to each other.

Another aspect of the present invention provides a flexible optical wiring board that includes a flexible optical waveguide layer, a reinforcing clad, which is selectively formed on one surface of the optical waveguide layer, and a mirror groove, which is formed on the other surface of the optical waveguide layer in accordance with where the reinforcing clad is formed.

The optical wiring board can further include a flexible cover layer stacked on one surface of the optical waveguide layer, in which the cover layer covers the reinforcing clad.

The optical wiring board can further include a metal reflection layer stacked on the mirror groove.

The optical wiring board can further include an insulation layer stacked on the other surface of the optical waveguide layer, in which the insulation layer has a through-hole formed therein to correspond to the mirror groove, and the metal reflection layer can be formed on an inner wall of the mirror groove and the through-hole.

The optical wiring board can further include an electrode pad formed on one surface of the optical waveguide layer and disposed adjacent to the reinforcing clad.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

Figure 1:
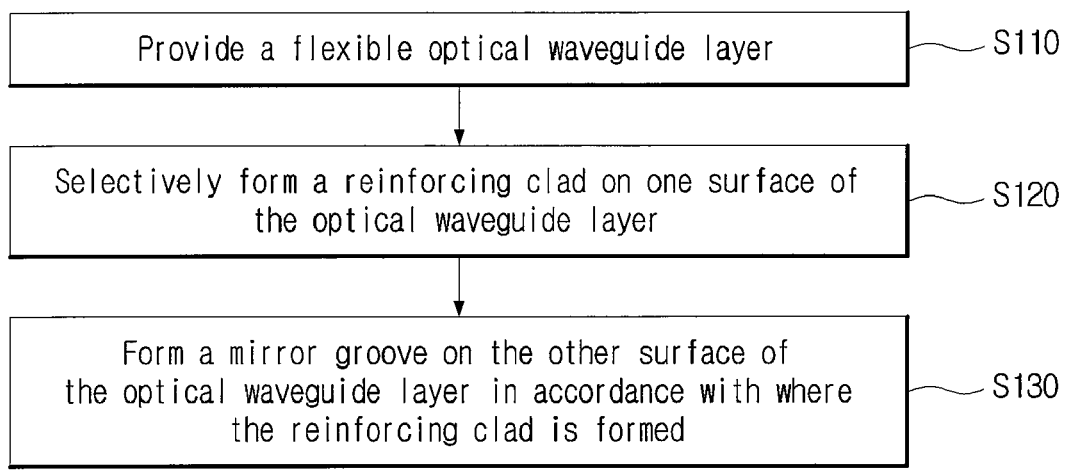
FIG. 1 is a flowchart illustrating a method of manufacturing a flexible optical wiring board in accordance with an embodiment of the present invention.

FIG. 1 is a flowchart illustrating a method of manufacturing a flexible optical wiring board in accordance with an embodiment of the present invention, and FIGS. 2 to 11 are cross-sectional views illustrating a method of manufacturing a flexible optical wiring board in accordance with an embodiment of the present invention.

The method of manufacturing an optical wiring board in accordance with an embodiment of the present invention includes providing an optical waveguide layer (S110), forming a reinforcing clad (S120) and forming a mirror groove (S130).

In the step of providing an optical waveguide layer (S110), a flexible optical waveguide layer 10 is provided. The optical waveguide layer 10 is a part that transfers an optical signal and is made of a flexible material that can be bent.

Figure 2:
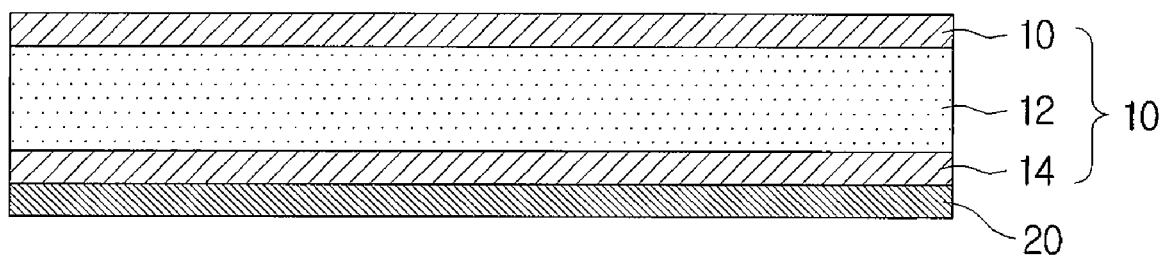
FIGS. 2 to 11 are cross-sectional views illustrating a method of manufacturing a flexible optical wiring board in accordance with an embodiment of the present invention.

In this embodiment, as illustrated in FIG. 2, the optical waveguide layer 10 is formed by stacking a lower clad layer 13, a core layer 12 and an upper clad layer 14 successively on a metal layer 20. Here, the optical waveguide layer 10 can be stacked by various known methods such as spin coating, dispensing, ink jetting and vacuum laminating. Also, the optical waveguide layer 10 can be formed by various known methods such as exposing/developing, UV-molding and laser patterning.

In the step of forming a reinforcing clad (S120), the reinforcing clad 30 is selectively formed on one surface of the optical waveguide layer 10. The reinforcing clad 30 is partially formed on one surface, which is on the opposite side of the other surface of the optical waveguide layer 10 on which the mirror groove 15 is formed, in accordance with the location where the minor groove 15 is to be formed. Accordingly, even though the optical waveguide layer 10 is generally made thinner, a sufficient margin for processing the minor groove 15 can be obtained.

Figure 3:
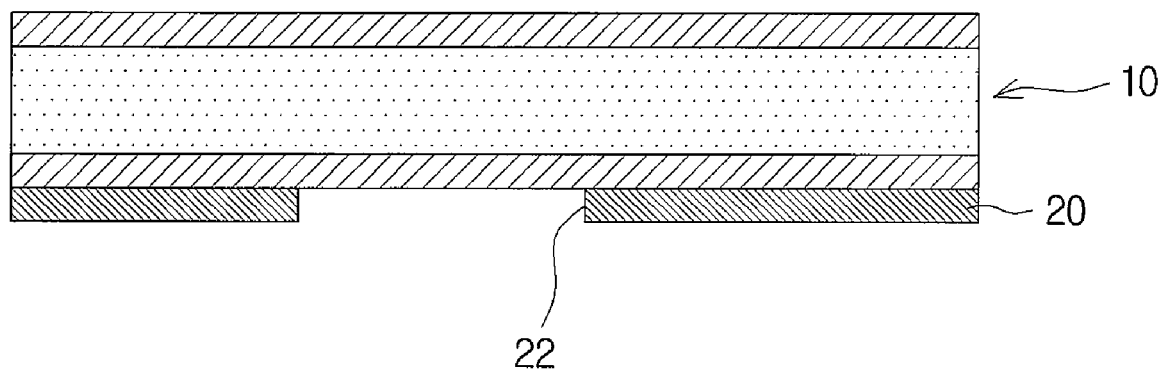
Figure 4:
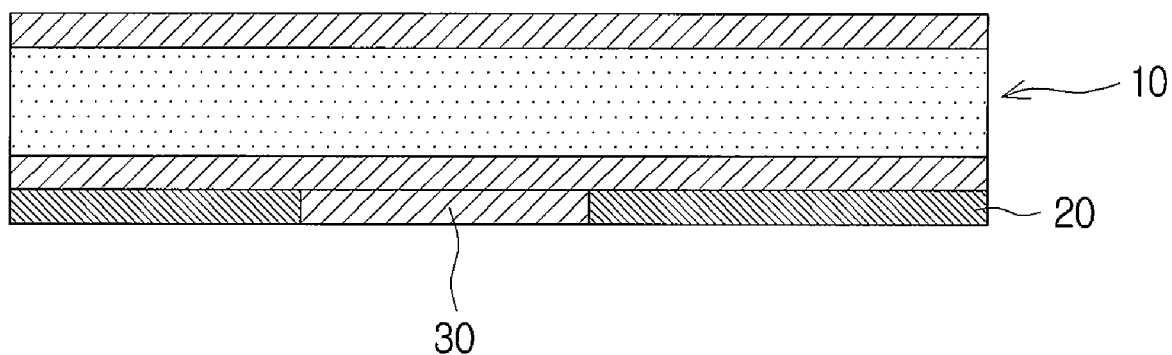
Figure 5:
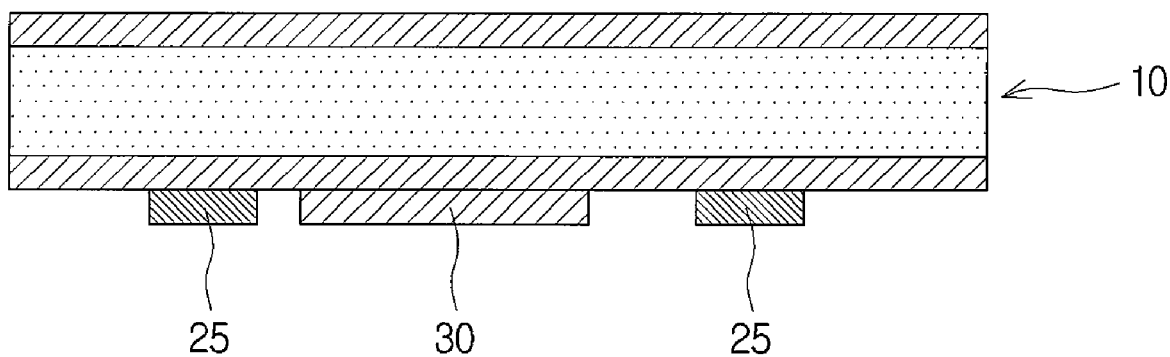
Figure 6:
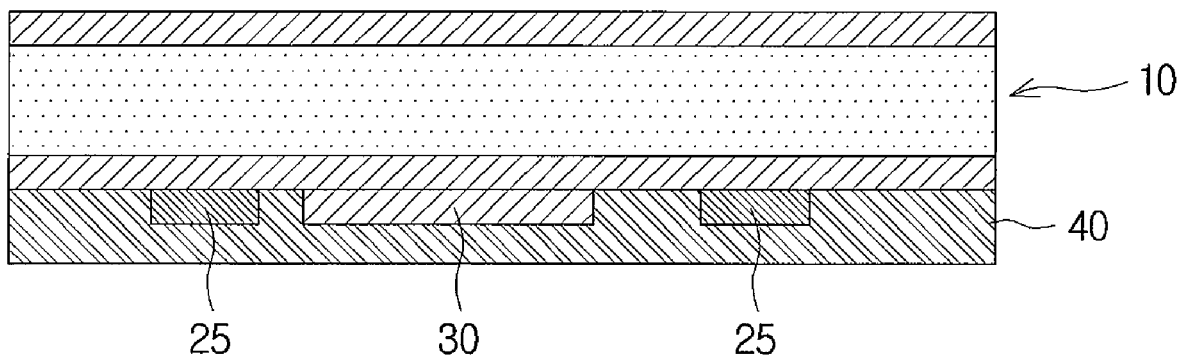

In this embodiment, as illustrated in FIGS. 3 to 5, the reinforcing clad 30 having a desired thickness can be readily formed by selectively removing the metal layer 20 formed on one surface of the optical waveguide layer 10 to form a clad groove 22 and then filling the clad groove 22 with a clad material. After forming the reinforcing clad 30, the metal layer 20 can be selectively removed to form a circuit pattern 25.

Figure 8:
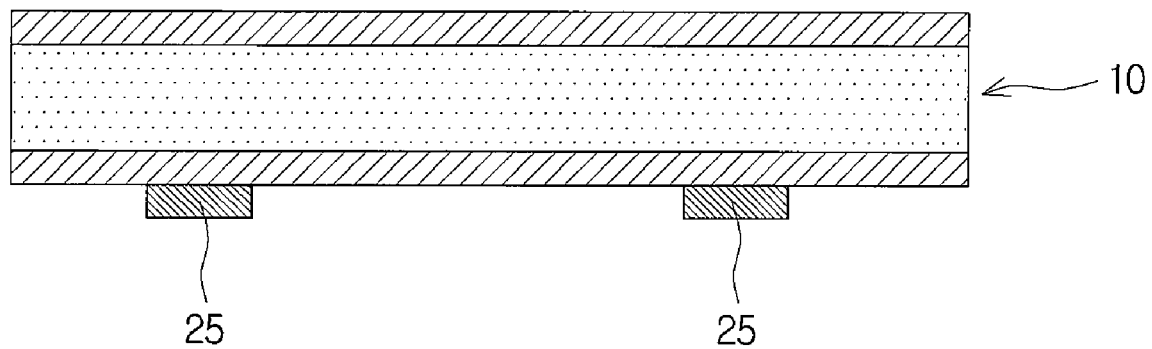
Figure 9:
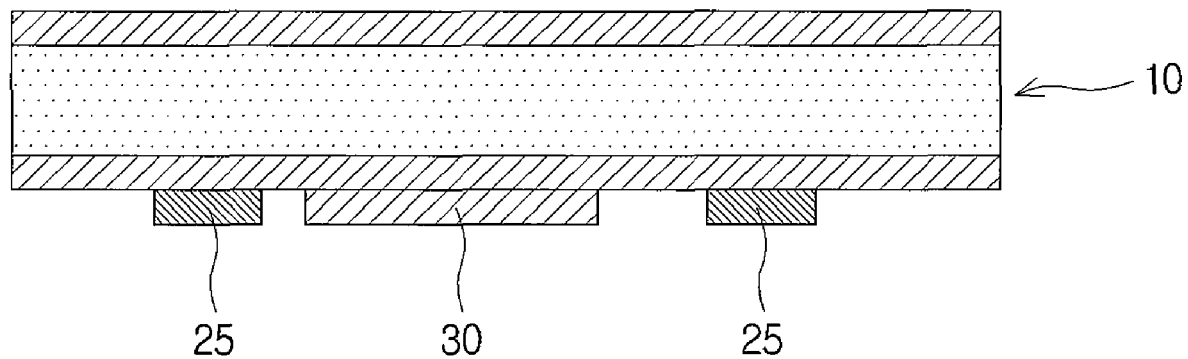

However, the method of forming the reinforcing clad 30 is not limited to this example, and it is also possible that the reinforcing clad 30 is selectively formed after forming the circuit pattern 25 by removing the metal layer 20 selectively, as illustrated in FIGS. 8 and 9.

Furthermore, as illustrated in FIGS. 12 to 17, it is possible that the reinforcing clad 30 is selectively formed on one surface of the optical waveguide layer 10 by forming a base substrate having the reinforcing clad 30 stacked thereon and then placing the optical waveguide layer 10 and the reinforcing clad 30 of the base substrate to face each other and compressing them together.

Figure 7:
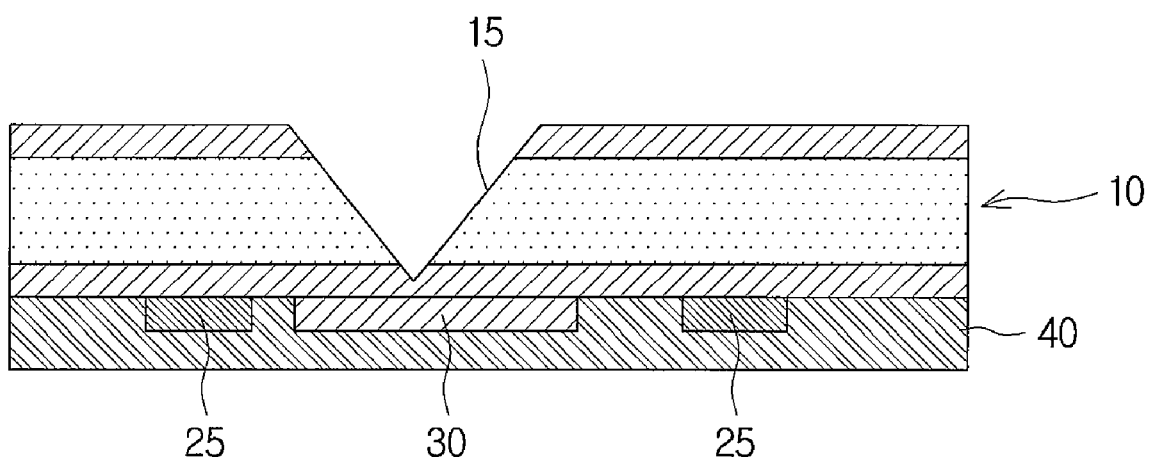

In the step of forming the mirror groove (S130), the mirror groove 15 is formed on the other surface of the optical waveguide layer 10 in accordance with where the reinforcing clad 30 is formed. Accordingly, as illustrated in FIG. 7, since the reinforcing clad 30 is formed on an opposite side of where the mirror groove 15 is formed, the mirror groove 15 can be readily formed, reducing the occurrence of defect in the optical wiring board caused by the process of forming the mirror groove 15.

Meanwhile, in the present embodiment, a flexible cover layer 40 can be additionally stacked on one surface of the optical waveguide layer 10 in order to protect the optical waveguide layer 10 and the reinforcing clad 30.

Figure 10:
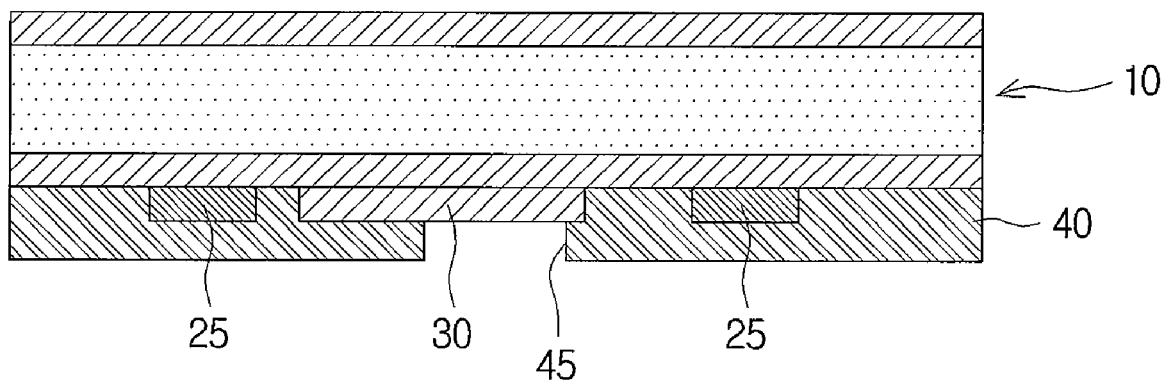
Figure 11:
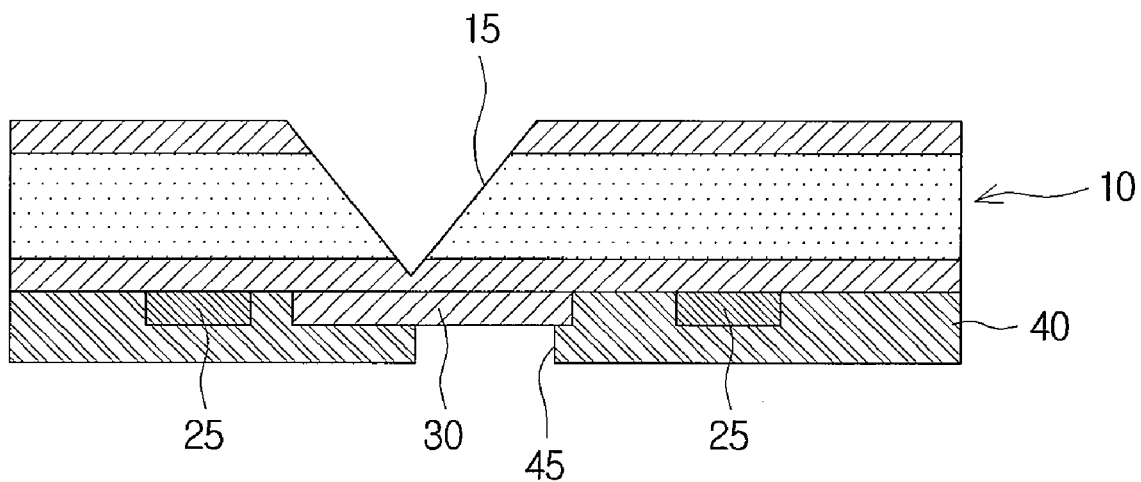
Figure 12:
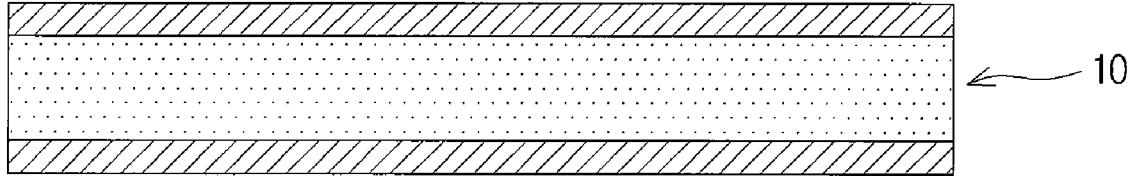
FIGS. 12 to 17 are cross-sectional views illustrating a method of manufacturing a flexible optical wiring board in accordance with another embodiment of the present invention.
Figure 13:
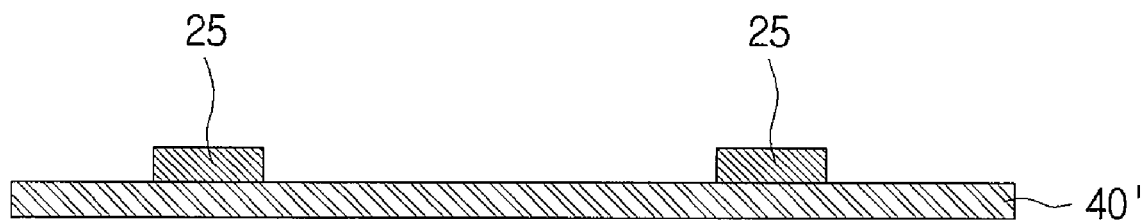
Figure 14:
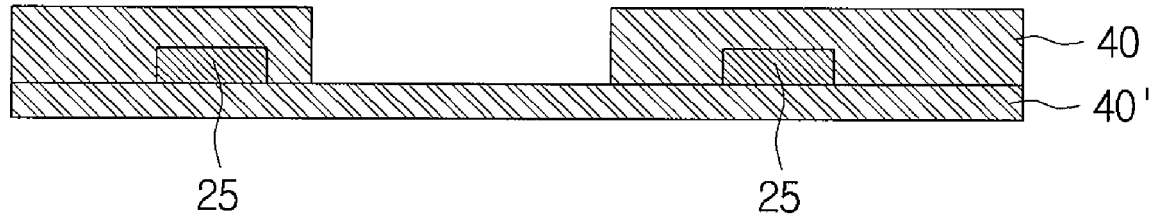
Figure 15:
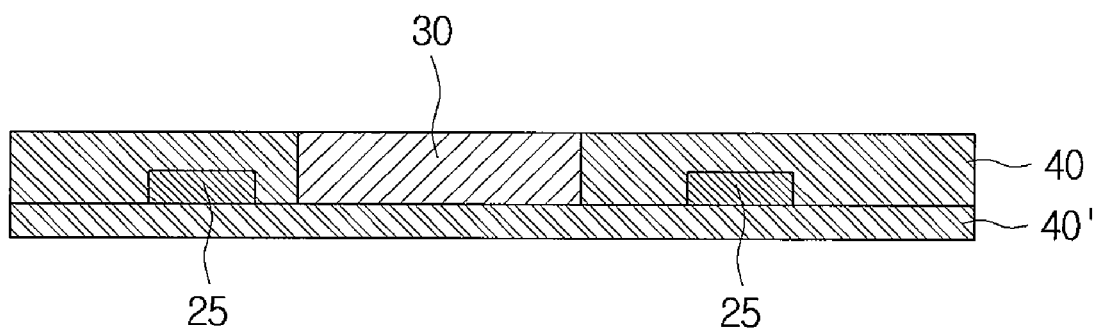
Figure 16:
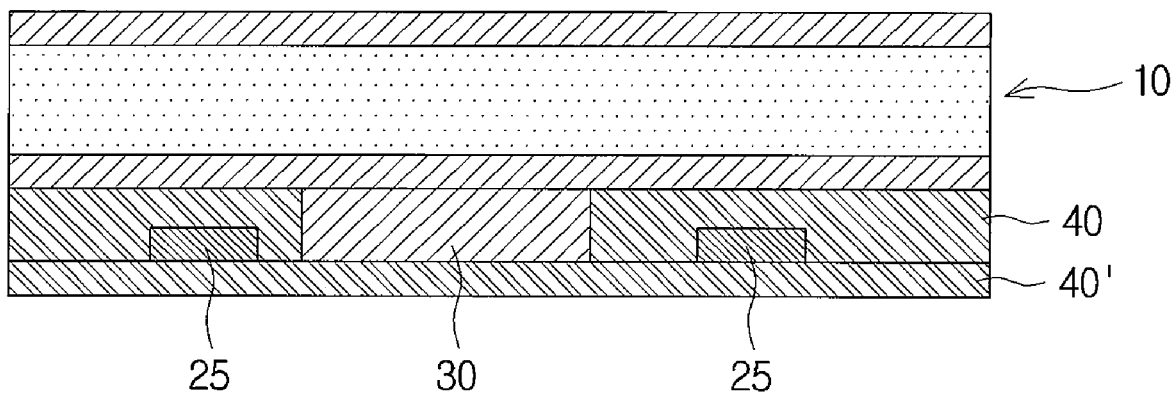
Figure 17:
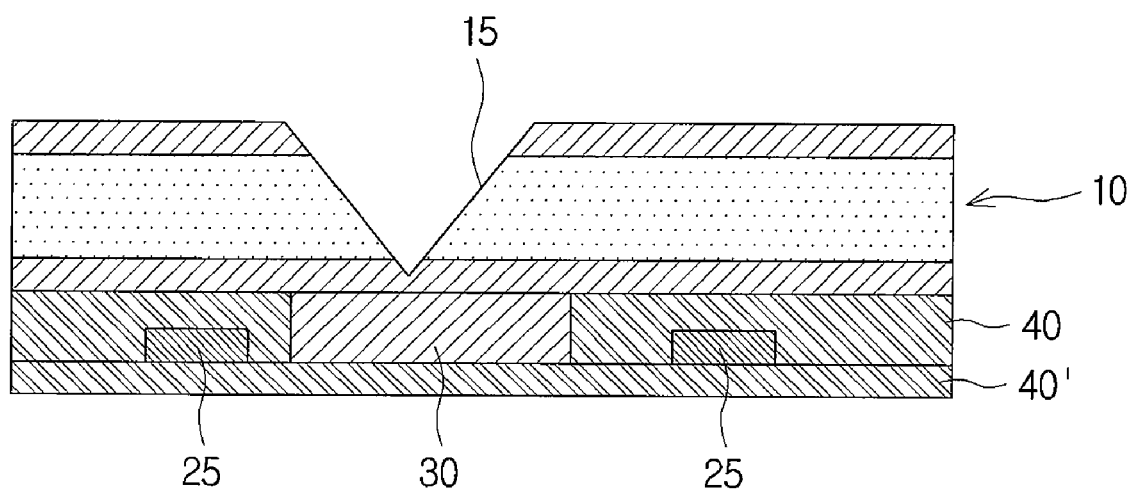

As illustrated in FIGS. 9 and 10, in order to facilitate the transfer of an optical signal to the optical waveguide layer 10, a groove-shaped light-permeable part 45 can be formed to correspond to the mirror groove 15 by selectively removing a portion of the cover layer 40 that is opposite to the mirror groove 15.

Figure 18:
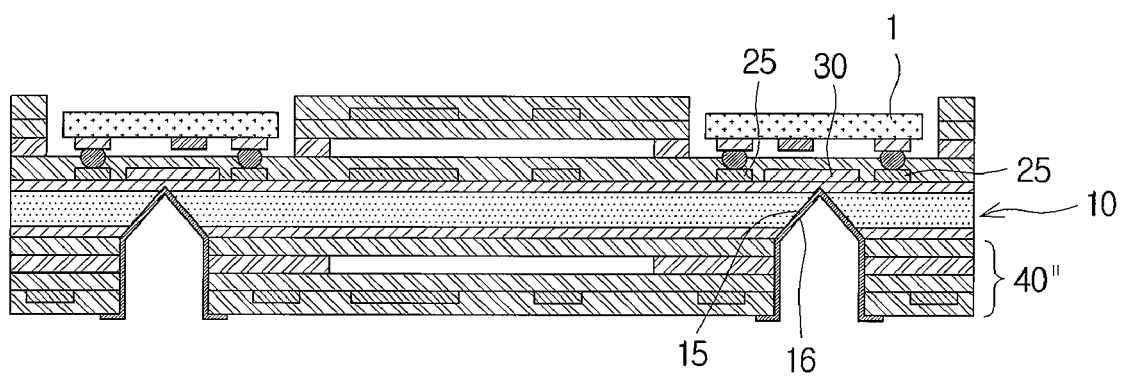
FIG. 18 is a cross-sectional view of a flexible optical wiring board in accordance with an embodiment of the present invention.

FIG. 18 is a cross-sectional view of a flexible optical wiring board in accordance with an embodiment of the present invention.

A flexible optical wiring board in accordance with an embodiment of the present invention includes an optical waveguide layer 10, a reinforcing clad 30 and a mirror groove 15.

The optical waveguide layer 10 transfers an optical signal and is made of a flexible material that can be bent. Specifically, the optical waveguide layer 10 of the present embodiment is formed by stacking a lower clad layer 13, a core layer 12 and an upper clad layer 14 successively.

The reinforcing clad 30 prevents the optical waveguide layer 10 from being damaged by a process of forming the mirror groove 15 and is formed on one surface of the optical waveguide layer 10 that is placed opposite to the mirror groove 15. Since the reinforcing clad 30 is selectively formed only on an opposite side of where the mirror groove 15 is formed, a sufficient margin for processing the mirror groove 15 can be obtained even though the optical waveguide layer 10 is generally made thinner.

In order to protect the optical waveguide layer 10 and the reinforcing clad 30, a flexible cover layer 40 covering the reinforcing clad 30 can be stacked on one surface of the optical waveguide layer 10.

Furthermore, an electrode pad 25, on which a photoelectric device 1 is mounted, can be formed adjacent to the reinforcing clad 30. Since the reinforcing clad 30 is placed opposite to face the mirror groove 15, an optical signal is reflected by a metal reflection layer 16 toward the reinforcing clad 30 and can be transferred to the photoelectric device 1 placed on top of the reinforcing clad 30. Here, the reinforcing clad 30 is made of a light-permeable material to guide the optical signal while minimizing the attenuation of the optical signal.

The mirror groove 15, which is where a mirror surface by which an optical signal is reflected is formed, is in the shape of a groove on the other surface of the optical waveguide layer 10 in accordance with where the reinforcing clad 30 is formed. As described above, since the reinforcing clad 30 is formed on an opposite side of where the mirror groove 15 is formed, the mirror groove 15 can be readily formed, reducing the occurrence of defect in the optical wiring board caused by the process of forming the mirror groove 15.

Then, a metal reflection layer 16 on which a metal used as a mirror is stacked can be formed on the mirror groove 15. In order to increase the adhesion between the mirror groove 15 and the metal reflection layer 16, an insulation layer 50 having a through-hole formed therein to correspond to the mirror groove 15 can be stacked on the other surface of the optical waveguide layer 10, and the metal reflection layer 16 can be formed continuously on the inner wall of the through-hole, in addition to the mirror groove 15.

Meanwhile, the metal reflection layer 16 can be coated on the mirror groove 15 by various known methods such as plating, sputtering and E-beam evaporation.

By utilizing certain embodiments of the present invention as set forth above, the clad can be formed thick only on the place where the mirror groove is to be formed, and thus a flexible optical wiring board having flexibility can be manufactured even though the optical wiring board is generally made thin.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

As such, many embodiments other than those set forth above can be found in the appended claims.

What is claimed is:

1. A method of manufacturing a flexible optical wiring board, the method comprising:
   providing a flexible optical waveguide layer;
   forming a reinforcing clad on a portion of one surface of the optical waveguide layer; and
   forming a mirror groove on the other surface of the optical waveguide layer in accordance with the portion where the reinforcing clad is formed.

2. The method of claim 1, further comprising stacking a flexible cover layer on one surface of the optical waveguide layer, the cover layer covering the reinforcing clad.

3. The method of claim 2, further comprising forming a groove-shaped light-permeable part to correspond to the mirror groove by selectively removing a portion of the cover layer.

4. The method of claim 1, wherein in the providing of an optical waveguide layer, an optical waveguide layer mounted on a metal layer is provided, and
   wherein the forming of a reinforcing clad comprises:
   forming a clad groove by selectively removing the metal layer; and
   forming a reinforcing clad in the clad groove.

5. The method of claim 4, further comprising, after the forming of a reinforcing clad, forming a circuit pattern by selectively removing the metal layer.

6. The method of claim 1, wherein the forming of a reinforcing clad comprises:
   providing a base substrate having the reinforcing clad stacked thereon;
   disposing the optical waveguide layer and the reinforcing clad of the base substrate in such a way that the optical waveguide layer and the reinforcing clad are placed opposite to face each other; and
   compressing the optical waveguide layer and the base substrate to each other.

7. A flexible optical wiring board comprising:
   a flexible optical waveguide layer;
   a reinforcing clad formed on a portion of one surface of the optical waveguide layer; and
   a mirror groove formed on the other surface of the optical waveguide layer in accordance with the portion where the reinforcing clad is formed.

8. The optical wiring board of claim 7, further comprising a flexible cover layer stacked on one surface of the optical waveguide layer, the cover layer covering the reinforcing clad.

9. The optical wiring board of claim 7, further comprising a metal reflection layer stacked on the mirror groove.

10. The optical wiring board of claim 9, further comprising an insulation layer stacked on the other surface of the optical waveguide layer, the insulation layer having a through-hole formed therein to correspond to the mirror groove,
    wherein the metal reflection layer is formed on an inner wall of the mirror groove and the through-hole.

11. The optical wiring board of claim 7, further comprising an electrode pad formed on one surface of the optical waveguide layer and disposed adjacent to the reinforcing clad.

\* \* \* \* \*